(12) United States Patent
Nguyen et al.

(10) Patent No.: US 6,602,962 B2
(45) Date of Patent: Aug. 5, 2003

(54) PROCESS FOR THE PRODUCTION OF HYDROGENATED NITRILE RUBBER

(75) Inventors: Paul Nguyen, London (CA); Carl Walter Von Hellens, Bright's Grove (CA)

(73) Assignee: Bayer Inc., Sarnia (CA)

(*) Notice: Subject to any disclaimer, the term of this patent is extended or adjusted under 35 U.S.C. 154(b) by 0 days.

(21) Appl. No.: 10/027,735

(22) Filed: Dec. 19, 2001

(65) Prior Publication Data

US 2002/0123574 A1 Sep. 5, 2002

(30) Foreign Application Priority Data

Dec. 22, 2000 (CA) .............................................. 2329551

(51) Int. Cl.⁷ .................................................. C08F 8/04
(52) U.S. Cl. ..................... 525/338; 525/329.3; 525/339
(58) Field of Search ................................... 525/338, 339

(56) References Cited

U.S. PATENT DOCUMENTS

| 3,700,637 A | 10/1972 | Finch, Jr. .................... 260/83.3 |
| 4,464,515 A | 8/1984 | Rempel et al. ............. 525/338 |
| 4,503,196 A | 3/1985 | Rempel et al. ............. 525/338 |
| 4,581,417 A | 4/1986 | Buding et al. ............... 525/338 |
| 4,631,315 A | 12/1986 | Buding et al. ............... 525/338 |
| 4,746,707 A | 5/1988 | Fiedler et al. ............... 525/338 |
| 4,795,788 A | 1/1989 | Himmler et al. ............. 525/338 |
| 4,812,587 A | 3/1989 | Fiedler et al. ............... 556/136 |
| 4,816,525 A | 3/1989 | Rempel et al. ............. 525/338 |
| 4,978,771 A | 12/1990 | Fiedler et al. ............... 558/459 |

FOREIGN PATENT DOCUMENTS

| EP | 0 354 413 | 2/1990 |
| EP | 0 359 269 | 3/1990 |
| GB | 1588491 | 1/1980 |
| JP | 01256501 A | * 10/1989 |
| NL | 10049993 | 9/1998 |

* cited by examiner

Primary Examiner—Bernard Lipman
(74) Attorney, Agent, or Firm—Joseph C. Gil; Jennifer R. Seng; Noland J. Cheung

(57) ABSTRACT

Disclosed herein is a process for the production of hydrogenated nitrile rubber. The appearance of corrosion in the plant equipment in which hydrogenated nitrile rubber is produced is due to the unexpected presence of relatively large amounts of HCl, generated, surprisingly, by the hydrodehalogenation of the monochlorobenzene solvent under the reaction conditions. The addition of a compatible weakly basic additive, such as Epoxidized Soy Bean Oil (ESBO), to the reaction mixture has alleviated this serious problem.

18 Claims, 2 Drawing Sheets

| Fat or Oil | Saturated acids, % | | | | | | | | Unsaturated acids, % | | | | | | | |
|---|---|---|---|---|---|---|---|---|---|---|---|---|---|---|---|---|
| | | | | | | | | | Enoic | | | | | | Di-enoic | Tri-enoic |
| | $C_8$ | $C_{10}$ | $C_{12}$ | $C_{14}$ | $C_{15}$ | $C_{18}$ | >$C_{18}$ | <$C_{16}$ | $C_{16}$ | $C_{18}$ | >$C_{18}$ | | | | $C_{18}$ | $C_{18}$ |
| Beef Tallow | | | | 2 – 3 | 25 – 30 | 21 – 26 | 0.4 – 1 | 0.5 | 2 – 3 | 39 – 42 | 0.3 | | | | 2 | |
| Butter | 1 – 2[a] | 2 – 3 | 1 – 4 | 8 – 13 | 25 – 32 | 8 – 13 | 0.4 – 2 | 1 – 2 | 2 – 5 | 22 – 29 | 0.2 – 1.5 | | | | 3 | |
| Coconut | 5 – 9 | 4 – 10 | 44 – 51 | 13 – 18 | 7 – 10 | 1 – 4 | | | | 5 – 8 | 0 – 1 | | | | 1 – 3 | |
| Corn | | | | 0 – 2 | 8 – 10 | 1 – 4 | | | 1 – 2 | 30 – 50 | 0 – 2 | | | | 34 – 56 | |
| Cottonseed | | | | 0 – 3 | 17 – 23 | 1 – 3 | | | | 23 – 44 | 0 – 1 | | | | 34 – 55 | |
| Lard | | | | 1 | 25 – 30 | 12 – 16 | | 0.2 | 2 – 5 | 41 – 51 | 2 – 3 | | | | 3 – 8 | |
| Olive | | | 0 – 1 | 0 – 2 | 7 – 20 | 1 – 3 | 0 – 1 | | 1 – 3 | 53 – 86 | 0 – 3 | | | | 4 – 22 | |
| Palm | | | | 1 – 6 | 32 – 47 | 1 – 6 | | | | 40 – 52 | | | | | 2 – 11 | |
| Palm kernel | 2 – 4 | 3 – 7 | 45 – 52 | 14 – 19 | 6 – 9 | 1 – 3 | 1 – 2 | | 0 – 1 | 10 – 18 | | | | | 1 – 2 | |
| Peanut | | | | 0.5 | 6 – 11 | 3 – 6 | 5 – 10 | | 1 – 2 | 39 – 66 | | | | | 17 – 38 | |
| Soybean | | | | 0.3 | 7 – 11 | 2 – 5 | 1 – 3 | | 0 – 1 | 22 – 34 | | | | | 50 – 60 | 2 – 10 |
| Cod liver | | | | 2 – 6 | 7 – 14 | 0 – 1 | | 0 – 2 | 10 – 20 | 25 – 31 | $C_{10}$ 25 – 32 | >$C_{20}$ 10 – 20 | | | | |
| Linseed | | | | 0.2 | 5 – 9 | 4 – 7 | 0.5 – 1 | | | 9 – 29 | | | | | 8 – 29[b] | 45 – 67[c] |
| Tung | | | | | | | | | | 4 – 13 | | | | | 8 – 15 | 78 – 82[d] | a  3 – 4% $C_4$; 1 – 2% $C_6$
b  Linoleic acid (cis,cis-9,12-octadecadienoic acid)
c  Linolenic acid (cis,cis,cis-9,12,15-octadecatrienoic acid)
d  Eleostearic acid; (cis,trans,trans-9,11,13-octadecatrienoic acid), and 3 – 6% saturated acids

Figure 1

Scheme 1 Formation of benzene and HCl as side reactions during hydrogenation of NBR

PROCESS FOR THE PRODUCTION OF HYDROGENATED NITRILE RUBBER

FIELD OF THE INVENTION

This invention relates to improvements in a process for the production of hydrogenated nitrite rubber.

BACKGROUND OF THE INVENTION

Hydrogenated nitrite butadiene rubber (HNBR) is a valuable elastomer known for its combination of unique properties, including high tensile strength, resistance to abrasion, high oil resistance and resistance to oxidation. HNBR may be produced by the homogeneously catalyzed selective hydrogenation of NBR with hydrogen in an organic solvent. In the context of the invention, "selective hydrogenation" is understood to mean the hydrogenation of the olefinic carbon-carbon double bonds, with the carbon-nitrogen triple bonds remaining intact. The expression "with the carbon-nitrogen triple bonds remaining intact" in this context means that less than 7%, preferably less than 5%, more preferably less than 3% and, most preferably, less than 1.5% of the nitrite groups originally present in the NBR are hydrogenated. The hydrogenation may be monitored by IR or NMR spectroscopy.

Rhodium and ruthenium compounds are commonly used to catalyze such hydrogenations (see, for example DE-PS 25 39 132, DE-OS 33 37 294, 34 33 392, 35 29 252, 35 40 918 and 35 41 689, EP-A 134 023 and 298 386 and U.S. Pat. Nos. 3,700,637, 4,464,515, 4,503,196 and 4,795,788).

A preferred catalyst has the formula:

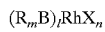

in which each R is, independently, a $C_1$-$C_8$-alkyl group, a $C_4$-$C_8$-cycloalkyl group a $C_6$-$C_{15}$-aryl group or a $C_7$-$C_{15}$-aralkyl, B is phosphorus, arsenic, sulfur, or a sulphoxide group S=0, X is hydrogen or an anion, preferably a halide and more preferably a chloride or bromide ion, I is 2, 3 or 4, m is 2 or 3 and n is 1, 2 or 3, preferably 1 or 3. Preferred catalysts are tris-(triphenylphosphine)-rhodium(I)-chloride, tris (triphenyl-phosphine)-rhodium (III)-chloride and tris-(dimethylsulphoxide)-rhodium(III) -chloride, and tetrakis-(triphenylphosphine)-rhodium hydride of formula $((C_6H_5)_3P)_4RhH$, and the corresponding compounds in which triphenylphosphine moieties are replaced by tricyclohexylphosphine moieties. The catalyst can be used in small quantities. An amount in the range of 0.01 to 1.0% preferably 0.02% to 0.6%, most preferably 0.06% to 0.12% by weight based on the weight of polymer is suitable.

The hydrogenation reaction can be carried out in solution. The solvent must be one which will dissolve nitrile butadiene rubber, in which the limitation excludes the use of unsubstituted aliphatic hydrocarbons. Suitable organic solvents are aromatic compounds including halogenated aryl compounds of 6 to 12 carbon atoms. The preferred halogen is chlorine and the preferred solvent is a chlorobenzene, especially monochlorobenzene. Other solvents that can be used include toluene, halogenated aliphatic compounds, especially chlorinated aliphatic compounds, ketones such as methyl ethyl ketone and methyl isobutyl ketone, tetrahydrofuran and dimethylformamide. The concentration of polymer in the solvent is not particularly critical but is suitably in the range from 1 to 30% by weight, preferably from 2.5 to 20% by weight, more preferably 6 to 15% by weight and most preferably 10 to 15% by weight. The concentration of the solution may depend upon the molecular weight of the copolymer rubber that is to be hydrogenated. Rubbers of higher molecular weight are more difficult to dissolve, and so are used at lower concentration.

It has recently been observed that, when using the aforementioned rhodium catalysts for the hydrogenation of NBR in monochlorobenzene solvent, there is a significant amount of corrosion in the plant equipment in which this process is carried out. The appearance of such corrosion is unexpected, as there is no obvious causative agent present which could initiate the corrosion process. This corrosion is a problem because it leads to extensive damage of plant equipment and necessitates costly repair work, resulting in production down-time. Further, such corrosion may result in product contamination which, obviously, seriously affects product quality. Thus, the presence of corrosion has a serious effect on overall productivity.

SUMMARY OF THE INVENTION

It has been determined that the aforementioned appearance of corrosion in the plant equipment in which hydrogenated nitrile rubber is produced is due to the presence of relatively large amounts of HCl. Since there is no obvious source of this acid in the reaction mixture, its appearance was entirely unexpected. It has been determined that the generation of HCl is, uniquely, a result of the particular conditions under which the hydrogenation of NBR is carried out. The HCl is actually generated by the hydrodehalogenation of the monochlorobenzene solvent under the reaction conditions.

The addition of a compatible weakly basic additive, such as Epoxidized Soy Bean Oil (ESBO), to the reaction mixture has alleviated this serious problem.

BRIEF DESCRIPTION OF THE DRAWINGS

FIG. 1 shows a table (ex. Organic Chemistry 5th Edition, Morrison and Boyd, Allyn and Bacon Inc.) which provides a list of the corresponding fats and oils, showing the percentages of the constituent fatty acids in each.

DETAILED DESCRIPTION OF THE INVENTION

Figure 2:
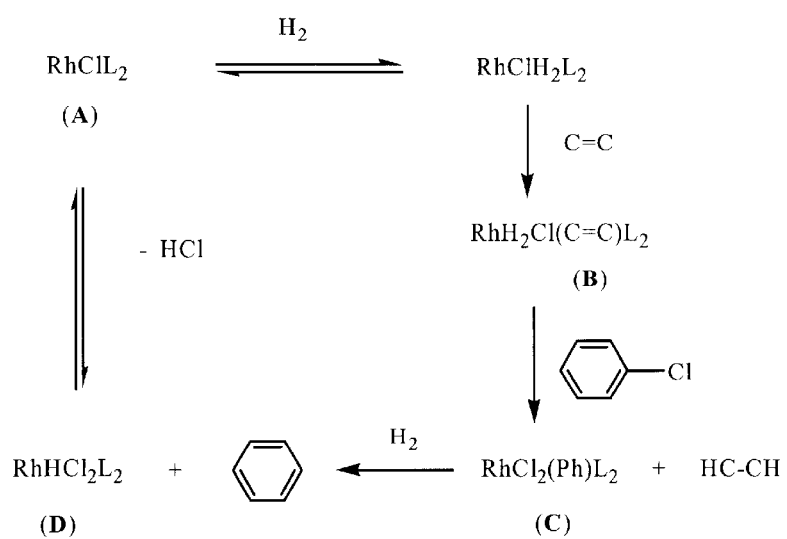
FIG. 2 shows a reaction system for scheme 1, the formation of benzene and HCL as side reactions during hydrogenation of NBR.

In the context of the invention, a "compatible weakly basic additive" is a weak base which is capable of neutralizing the HCl formed in the hydrogenation reaction mixture, but which does not have deleterious effects on the rubber itself, nor on the properties of compounds prepared from the rubber. Preferably, the additive is a liquid, as this facilitates its use in the plant environment. Non-limiting examples of such additives include primary aromatic amines such as octylamine, and epoxidized derivatives of fatty acid glycerides, which are prepared from the corresponding oils and fats by methods known in the art.

Suitable epoxidized fatty acid glycerides include epoxidized linseed oil, Epoxidized Soy Bean Oil (ESBO), epoxidized corn oil, epoxidized coconut oil, epoxidized cottonseed oil, epoxidized olive oil, epoxidized palm oil, epoxidized palm kernel oil, epoxidized peanut oil, epoxidized cod liver oil, epoxidized tung oil, epoxidized beef tallow, epoxidized butter and mixtures thereof.

Preferred additives are epoxidized linseed oil, ESBO, epoxidized corn oil, epoxidized cottonseed oil, epoxidized olive oil, epoxidized peanut oil, epoxidized tung oil and mixtures thereof.

The most preferred additive is ESBO. FIG. 1, (ex. Organic Chemistry 5th Edition, Morrison and Boyd, Allyn and Bacon Inc.) provides a list of the corresponding fats and oils, showing the percentages of the constituent fatty acids in each.

In the context of the present invention, the expression NBR is understood to encompass copolymers of a) 85 to 50% by weight and preferably 82 to 52% by weight conjugated diene, b) 15 to 50% by weight and preferably 18 to 48% by weight unsaturated nitrile and c) 0 to 10% by weight and preferably 0 to 8% by weight of one or more other monomers copolymerizable with conjugated dienes (a) and unsaturated nitrites (b).

Suitable conjugated dienes (a) are, for example, 1,3-butadiene, 2-methyl-1, 3-butadiene, 2,3-dimethyl-1,3-butadiene and 1,3-pentadiene; suitable unsaturated nitriles (b) are acrylonitrile and methacrylonitrile.

Suitable other monomers (c) are aromatic vinyl compounds, such as styrene, o-, m- or p-methyl styrene, ethyl styrene, vinyl naphthalene and vinyl pyridine, $\alpha,\beta$-unsaturated monocarboxylic acids containing 3 to 5 carbon atoms, such as acrylic acid, methacrylic acid and crotonic acid, and $\alpha,\beta$-unsaturated dicarboxylic acids containing 4 to 5 carbon atoms, such as maleic acid, fumaric acid, citraconic acid and itaconic acid, also vinyl chloride, vinylidene chloride, N-methylol acrylamide and vinyl alkyl ethers containing 1 to 4 carbon atoms in the alkyl moiety.

Preferred nitrile rubbers have glass transition temperatures below 0° C., Mooney viscosities (ASTM D1646) of generally 10 to 150 (preferably 15 to 100) [ML 1+4/100° C.] and average molecular weights, determined as weight averages $M_W$, in the range of from 500 to 500,000, preferably in the range of from 5,000 to 400,000, more preferably in the range of from 10,000 to 350,000 and, most preferably, in the range of from 15,000 to 300,000. The molecular weights $M_w$ may be determined by gel permeation chromatography, using polystyrene as standard.

The hydrogenation of nitrile rubbers can be controlled to yield polymers having different degrees of hydrogenation. For example, polymers in which the residual olefinic carbon-carbon double bond content is 20%, 10%, 5%, or even less than 5% can be produced (that is, 80%, 90% or even 95% or more of the olefinic carbon-carbon double bonds originally present have been hydrogenated). The degree of hydrogenation may be determined by IR or NMR spectroscopy.

The corrosion of the plant equipment in which NBR is hydrogenated causes extensive damage and necessitates costly repair work, which results in production down-time in an otherwise continuous process. The corrosion is particularly visible in the catalyst recovery area. It has been found that this corrosion problem is due to the presence of relatively large amounts of HCl in the hydrogenation reaction mixture, and that the HCl is generated by hydro-dehalogenation of the monochlorobenzene solvent (confirmed by the detection of benzene in the reaction mixture). This finding is unexpected because there have been, to date, no reports that such a catalyst system is capable of generating HCl. We have shown that it is the combination of Rhodium-based catalyst, monochlorobenzene solvent, hydrogen and NBR which leads to the generation of significant amounts of HCl (that is, all four components need to be present in order that significant amounts of HCl be generated).

Without being bound to any one particular theory or mechanism of action, it is thought that the HCl is generated by the mechanism shown in FIG. 2, Scheme 1.

We have shown that this problem can be solved by the addition of a compatible weakly basic additive (such as ESBO) to the polymer cement after the hydrogenation is complete (i.e. after the desired level of hydrogenation has been achieved) prior to further processing of the polymer cement (that is, in the after-break). The amount of ESBO added is in the range of from 0.01 to 10 phr (pounds per hundred pounds rubber), preferably in the range of from 0.05 to 5 phr and, most preferably in the range of from 0.1 to 2.0 phr. The addition of 1.2 phr of ESBO to an HNBR cement causes an increase in pH of about 2 pH units.

Practically, after the hydrogenation reaction is complete, excess hydrogen is purged from the reactor and the cement is transferred to a holding tank, where the compatible weakly basic additive is added to the cement. After stirring for a time sufficient to ensure that the HCl has been neutralized, the cement is processed as normal.

Compounding studies show that the addition of ESBO has no significant effect on the cure behaviour or compound physical properties of products prepared from the cement.

The invention is further illustrated in the following non-limiting examples:

EXAMPLES

Example 1

Hydrogenation of NBR

In this, a typical experiment, a polymer with a solid content of 15% was dissolved in monochlorobenzene. The cement solution was purged with nitrogen and then pressurized with hydrogen at 1200 psi under full agitation. The temperature of the reactor was raised to approximately 110° C. and a solution of tris-(triphenylphosphine)-rhodium-(I) chloride catalyst and triphenylphosphine co-catalyst in monochlorobenzene was added to the reactor under hydrogen. The temperature was maintained at 138° C. and the pressure at 1200 psi throughout the course of the reaction. The degree of hydrogenation was monitored by FTIR analysis of samples taken during the course of the reaction.

In this example, no ESBO was added to the reaction mixture. Thus, this example is provided for comparison purposes only.

Example 2

Addition of ESBO After the Hydrogenation of NBR

In this example, the hydrogenation of NBR was carried out exactly as above, but after the reaction was complete the reactor was purged with nitrogen (to remove excess hydrogen). The mixture was then transferred to a second vessel, and ESBO was added.

As can be seen from Table 1, below, the addition of ESBO to a representative sample of cement from this reaction caused an increase in pH of about 2 units.

TABLE 1

Effect of addition of ESBO to polymer cement

| Hydrogenated cement (pH) | Hydrogenated cement + 1.2 phr ESBO (pH) |
|---|---|
| 3.8 | 5.8 |
| 4.2 | 6.3 |

Rubber crumb was obtained from both of the above-examples by the injection of steam (to remove the monochlorobenzene). The rubber crumb was dried in an oven at 80° C. and used in the compounding studies below.

Example 3

Effect of ESBO on Physical Properties

In the Examples below, Carbon Black IRB #7 is Industry Reference Black #7 (N330 type); Naugard 445 was obtained from Uniroyal Chemical; Vulkanox ZMB-2/C5 was obtained from Bayer; Vulkacit CZ/EG-C was obtained from Bayer; VulKacit Thiuram/C was obtained from Bayer; Plasthall TO™ was obtained from C. P. Hall; Diak #7 was obtained from Dupont; Vulcup 40KE was obtained from Hercules.

A series of compounds were prepared (using both sulfur and peroxide cure systems) using HNBR which contained 0, 0.8 or 1.2 phr ESBO (as shown in Table 2), according to the formulations shown in Tables 3 and 4, and the compounds subjected to standard test procedures, the results of which are shown in Tables 5 to 7.

TABLE 2

Polymer Identification

| | ESBO Content (phr) | Polymer Mooney ML 1 + 4' @ 100° C. |
|---|---|---|
| HNBR #1 | 0 | 66 |
| HNBR #2 | 0.8 | 66 |
| HNBR #3 | 1.2 | 69 |

TABLE 3

Sulfur cure formulation

| Compound | A | B | C |
|---|---|---|---|
| HNBR #1 (Control - 0 phr ESBO) | 100 | | |
| HNBR #2 (0.8 phr ESBO) | | 100 | |
| HNBR #3 (1.2 phr ESBO | | | 100 |
| Carbon Black, IRB#7 | 40 | 40 | 40 |
| Naugard 445 | 1 | 1 | 1 |
| Stearic Acid | 1 | 1 | 1 |
| Vulkanox ZMB-2/C5 (ZMMBI) | 0.4 | 0.4 | 0.4 |
| Zinc Oxide | 3 | 3 | 3 |
| Spider Sulfur | 0.5 | 0.5 | 0.5 |
| Vulkacit CZ/EG-C (CBS) | 0.5 | 0.5 | 0.5 |
| Vulkacit Thiuram/C (D) | 2 | 2 | 2 |

TABLE 4

Peroxide cure formulation

| Compound | D | E | F |
|---|---|---|---|
| HNBR #1 (Control - 0 phr ESBO) | 100 | | |
| HNBR #2 (0.8 phr ESBO) | | 100 | |
| HNBR #3 (1.2 phr ESBO | | | 100 |
| Carbon Black, N 660 | 50 | 50 | 50 |
| Naugard 445 | 1 | 1 | 1 |
| Plasthall TOTM | 5 | 5 | 5 |
| Vulkanox ZMB-2/C5 (ZMMBI) | 0.4 | 0.4 | 0.4 |
| Zinc Oxide | 3 | 3 | 3 |
| Diak #7 (TAIC) | 1.5 | 1.5 | 1.5 |
| Vulcup 40KE | 7.5 | 7.5 | 7.5 |

TABLE 5

Compound Mooney Scorch

| | Sulfur Cured | | | Peroxide Cured | | |
|---|---|---|---|---|---|---|
| Compound | A | B | C | D | E | F |
| Rotor Size: large t5 @ 135° C. (min) | 8.09 | 8.17 | 8.59 | 9.91 | 10.26 | 10.24 |

In both the sulfur and peroxide cured compounds, the compound Mooney scorch (which measures the rate at which a rubber compound will cure) was found to be fairly consistent for each type of cure system.

TABLE 6

MDR data

| | Sulfur Cured | | | Peroxide Cured | | |
|---|---|---|---|---|---|---|
| Compound | A | B | C | D | E | F |
| Frequency (Hz) | 1.7 | 1.7 | 1.7 | 1.7 | 1.7 | 1.7 |
| Test Temperature (° C.) | 170 | 170 | 170 | 170 | 170 | 170 |
| Degree Arc (°) | 1 | 1 | 1 | 1 | 1 | 1 |
| Test Duration (min) | 30 | 30 | 30 | 30 | 30 | 30 |
| Torque Range (dN · m) | 100 | 100 | 100 | 100 | 100 | 100 |
| MH (dN · m) | 44.15 | 45.02 | 43.81 | 58.77 | 57.82 | 61.57 |
| ML (dN · m) | 2.83 | 2.88 | 3.08 | 2.71 | 2.86 | 3.03 |
| Delta MH–ML (dN · m) | 41.31 | 42.14 | 40.73 | 56.06 | 54.96 | 58.54 |
| ts 1 (min) | 1.01 | 1.02 | 1.05 | 0.48 | 0.48 | 0.45 |
| ts 2 (min) | — | — | — | 0.63 | 0.65 | 0.60 |
| t' 10 (min) | 1.45 | 1.47 | 1.50 | 1.08 | 1.12 | 1.07 |
| t' 25 (min) | — | — | — | 2.13 | 2.22 | 2.19 |
| t' 50 (min) | 2.11 | 2.11 | 1.84 | 4.27 | 4.42 | 4.64 |
| t' 90 (min) | 3.33 | 3.20 | 3.06 | 12.54 | 12.80 | 13.82 |
| t' 95 (min) | | | | 16.00 | 16.22 | 17.66 |
| Delta t'50–t'10 (min) | 0.66 | 0.65 | 0.69 | 3.19 | 3.30 | 3.42 |

All compounds showed comparable cure behavior in the MDR test, which is another method for measuring the cure characteristics of a compound. Viscosity, scorch characteristics, cure rate and modulus information can be obtained using this test.

TABLE 7

Unaged stress-strain data

| Sulfur Cured | Peroxide Cured |
|---|---|

| Compound | A | B | C | D | E | F |
|---|---|---|---|---|---|---|
| Cure Time (min) | 8 | 8 | 8 | 18 | 18 | 18 |
| Cure Temperature (° C.) | 170 | 170 | 170 | 170 | 170 | 170 |
| Dumbell | die C | die C | die C | die C | die C | die C |
| Test Temperature (° C.) | 23 | 23 | 23 | 23 | 23 | 23 |
| Hard. Shore A2 Inst. (pts.) | 70 | 71 | 71 | 73 | 72 | 73 |
| Ultimate Tensile (MPa) | 35.50 | 34.15 | 36.41 | 23.96 | 22.32 | 23.72 |
| Ultimate Elongation (%) | 460 | 434 | 469 | 196 | 186 | 174 |
| Stress @ 25 (MPa) | 1.33 | 1.30 | 1.30 | 1.42 | 1.37 | 1.47 |
| Stress @ 50 (MPa) | 1.83 | 1.82 | 1.82 | 2.86 | 2.59 | 2.91 |
| Stress @ 100 (MPa) | 3.04 | 3.10 | 3.05 | 9.28 | 8.47 | 9.64 |
| Stress @ 200 (MPa) | 9.16 | 9.34 | 9.01 | | | |
| Stress @ 300 (MPa) | 18.28 | 18.71 | 18.08 | | | |

The unaged stress-strain data showed that all vulcanizates exhibited the same hardness, and very similar tensile strength and elongation and moduli.

In conclusion, while slight differences in certain physical properties were observed, the overall results confirm that the addition of ESBO to the hydrogenation reaction mixture after the hydrogenation of NBR has no deleterious effects on the polymer.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing hydrogenated nitrile butadiene rubber comprising the steps of:
   a) catalytically hydrogenating nitrile butadiene rubber in monochlorobenzene solvent using a Rhodium-based catalyst; and
   b) adding a compatible weakly basic additive to the reaction mixture after the desired degree of hydrogenation has been achieved.

2. A process according to claim 1, wherein the compatible weakly basic additive is an epoxidized derivative of a fatty acid glyceride.

3. A process according to claim 2, wherein the epoxidized fatty acid glyceride is selected from the group consisting of epoxidized linseed oil, ESBO, epoxidized corn oil, epoxidized coconut oil, epoxidized cottonseed oil, epoxidized olive oil, epoxidized palm oil, epoxidized palm kernel oil, epoxidized peanut oil, epoxidized cod liver oil, epoxidized tung oil, epoxidized beef tallow, epoxidized butter and mixtures thereof.

4. A process according to claim 3, wherein the epoxidized fatty acid glyceride is selected from the group consisting of epoxidized linseed oil, ESBO, epoxidized corn oil, epoxidized cottonseed oil, epoxidized olive oil, epoxidized peanut oil, epoxidized tung oil and mixtures thereof.

5. A process according to claim 4, wherein the epoxidized fatty acid glyceride is ESBO.

6. A process according to claim 1, wherein the amount of 0.01 phr to about 10 phr.

7. A process according to claim 6, wherein the amount of compatible weakly basic additive added is in the range of from about 0.05 phr to about 5 phr.

8. A process according to claim 7, wherein the amount of compatible weakly basic additive added is in the range of from about 0.1 phr to about 2 phr.

9. A process according to claim 1, wherein the compatible weakly basic additive is ESBO, added in an amount of from about 0.1 phr to about 2 phr.

10. A method for reducing corrosion in plant equipment in which nitrile butadiene rubber is hydrogenated by catalytic hydrogenation in monochlorobenzene using a rhodium-based catalyst which comprises adding a compatible weakly basic additive to the reaction mixture after the desired degree of hydrogenation has been achieved.

11. A method according to claim 10, wherein the compatible weakly basic additive is an epoxidized derivative of a fatty acid glyceride.

12. A method according to claim 11, wherein the epoxidized fatty acid glyceride is selected from the group consisting of epoxidized linseed oil, ESBO, epoxidized corn oil, epoxidized coconut oil, epoxidized cottonseed oil, epoxidized olive oil, epoxidized palm oil, epoxidized palm kernel oil, epoxidized peanut oil, epoxidized cod liver oil, epoxidized tung oil, epoxidized beef tallow, epoxidized butter and mixtures thereof.

13. A method according to claim 12, wherein the epoxidized fatty acid glyceride is selected from the group consisting of epoxidized linseed oil, ESBO, epoxidized corn oil, epoxidized cottonseed oil, epoxidized olive oil, epoxidized peanut oil, epoxidized tung oil and mixtures thereof.

14. A method according to claim 13, wherein the epoxidized fatty acid glyceride is ESBO.

15. A method according to claim 10, wherein the amount of compatible weakly basic additive added is in the range of from about 0.01 phr to about 10 phr.

16. A method according to claim 15, wherein the amount of compatible weakly basic additive added is in the range of from about 0.05 phr to about 5 phr.

17. A method according to claim 16, wherein the amount of compatible weakly basic additive added is in the range of from about 0.1 phr to about 2 phr.

18. A method according to claim 10, wherein the compatible weakly basic additive is ESBO, added in an amount of from about 0.1 phr to about 2 phr.

* * * * *